Patented Feb. 12, 1952

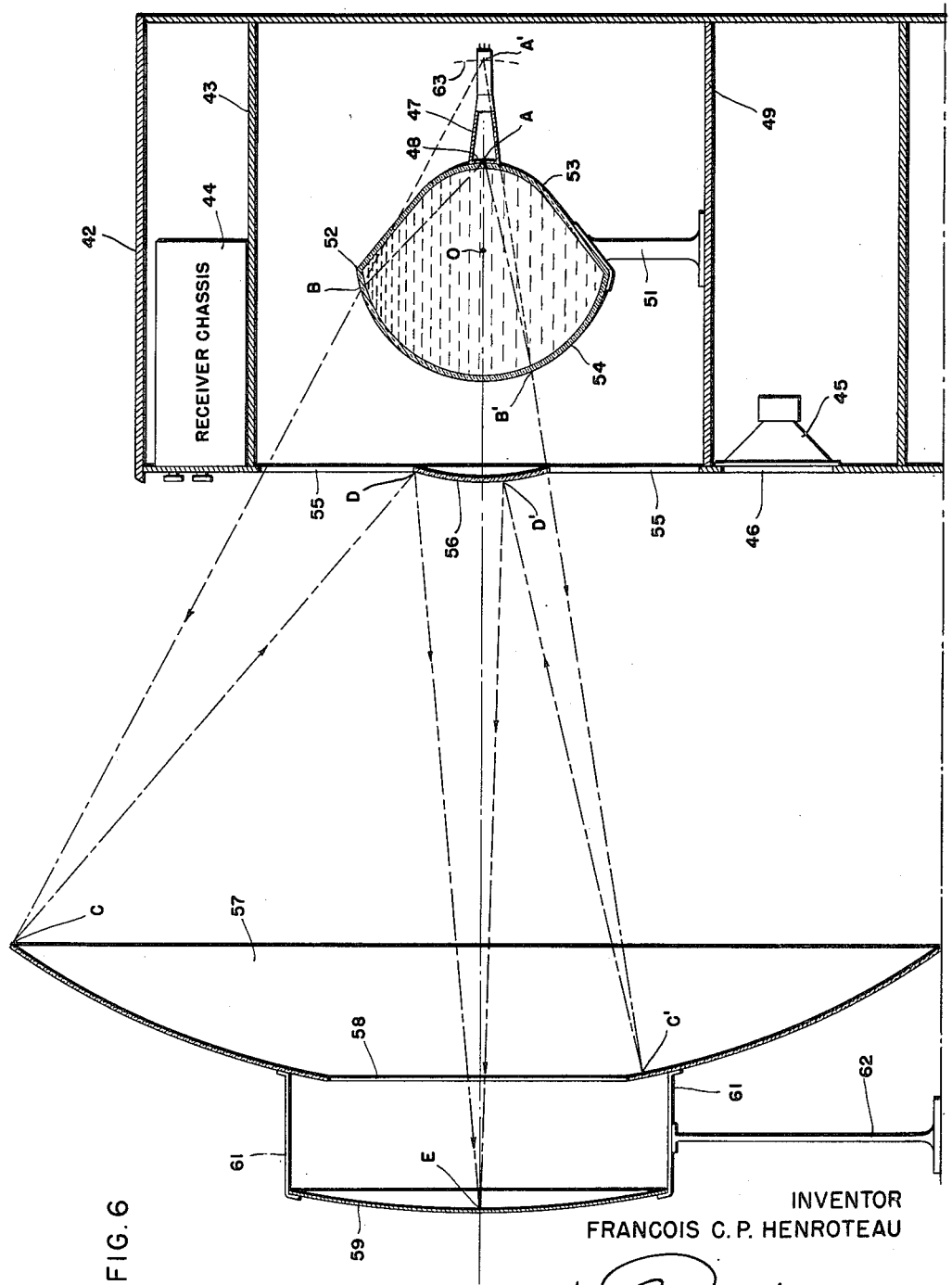

2,585,009

UNITED STATES PATENT OFFICE 2,585,009

CONCENTRIC OPTICAL SYSTEM

François Charles Pierre Henroteau, Fort Wayne, Ind., assignor, by mesne assignments, to Farnsworth Research Corporation, a corporation of Indiana Application August 2, 1945, Serial No. 608,450

10 Claims. (Cl. 177—319)

This invention relates to optical systems and particularly to wide angle optical systems of the type employing spherical optical surfaces.

For many purposes such as in astronomical telescopes, television cameras and projectors it is desirable to employ an optical system having as large an aperture relative to its focal length as possible. By means of such systems astronomical telescopes, television cameras, projectors and the like may be provided with large light gathering properties. Also, of particular importance in the case of a television projector, such an optical system enables the employment of the available light to maximum efficiency. One optical system having in general the desired properties is based upon the well known Schmidt camera. Its relatively wide angle is derived from the use of a spherical mirror which by itself was used prior to the introduction of the Schmidt camera. In the Schmidt camera, which also has been adapted for use in television projection receivers as well as in astronomical telescopes, an aspherical correcting plate is introduced in the light path between the spherical mirror and the image plane for the purpose of correcting by refraction for the spherical aberration of the mirror.

The Schmidt optical system, however, has a number of disadvantages. In the first place it is difficult to form a correction plate having the required configuration to compensate for the spherical aberration of the mirror. These correction plates moreover are designed to concentrate substantially at one point in the focal plane all of the light rays emanating from one point of the object. In order to achieve this result the configuration of the correction plate is irregular in that it lacks symmetry between all points on the surface and a common point or axis of reference. Consequently, the light rays emanating from points on the object other than that for which the correction plate is computed are brought into only approximate focus in the focal plane. The result produced by such an optical system is, therefore, not a true image of the object but instead is a somewhat distorted image of the object.

It, therefore, is an object of the present invention to provide an optical system consisting principally of spherical optical surfaces and having a large aperture relative to its focal length, whereby to produce a substantially undistorted image of an object upon a predetermined focal surface.

Another object of the invention is to provide a catoptric or all-reflecting optical system which has a large relative aperture and is substantially free from all types of aberration.

Still another object of the invention is to provide a catadioptric system or one which consists of both reflecting and refracting components which has a large relative aperture and is capable of producing an enlarged image of substantially any desired magnification which is substantially undistorted.

A further object of the invention is to provide an optical system consisting principally of spherical optical surfaces and which is suitable for use in a television projection receiver for producing enlarged television pictures on a viewing screen.

Still another object of the invention is to provide a modified catoptric system suitable for use in a television projection receiver embodying a cathode ray tube.

In accordance with the instant invention there is provided an optical system composed principally of optical surface members. The expression, "optical surface member" as used in this specification and in the appended claims is intended to define a structure having one or more surfaces at which the direction of a light ray may change, depending upon the character of the surface and the angle of incidence of the ray. It is contemplated that optical surface member be interpreted broadly enough to define both reflecting and refracting devices such as mirrors and lenses.

The optical surfaces and also the object and image surfaces are portions of concentric spheres. Although it is no absolutely essential to the successful operation of the system, for design or other purposes these spherical surfaces may be symmetrically disposed relative to the central axis of the system. The optical surface members are located in the light path between the object surface and the image surface members. The respective radii of the object and image surfaces are proportional to the order of magnification or demagnification desired by the use of the system. Merely for convenience in the following description the object surface will be considered as the one having the smaller radius and the image surface as the one having the larger radius. Also, in this connection reference will be made to magnification only. However, since it is true that this optical system has in common with other optical systems the property of being reversible, the spherical surface having the greater radius may be considered as the object surface and the one having the smaller radius, the image surface, in which case demagnification will be effected. The principal characteristic feature of this invention is that all of the spherical surfaces have a common center of curvature. As a consequence of this concentricity the light emanating from all points of the object surface is similarly focused without perceptible distortion at corresponding points on the image surface.

One embodiment of the invention is in a catoptric or all-reflecting system. In such a form all of the spherical optical surface members are of the reflecting type. Preferably, they are arranged relative to the object surface and image surface members in such a manner that the light is reflected alternately from concave and convex spherical reflectors. It is also desirable that at least two reflectors be used, one of which is concave and the other of which is convex. Nevertheless, it is contemplated to be within the purview of this invention to use more reflecting members if desired.

Another embodiment of the present invention is in a catadioptric system which comprises both reflecting and refracting optical surface members. In its simplest form the invention embodied in this type of system comprises substantially spherical object-surface and image-surface members, and in addition, one substantially spherical reflecting surface and two substantially spherical refracting surfaces. If desired, however, additional reflecting and/or refracting surfaces may be incorporated in a catadioptric system embodying the present invention. Irrespective of the number of object optical surfaces employed, it is essential that all of them be substantially spherical and, in accordance with the principal feature of the invention, the spherical surfaces of all members of such a system are substantially concentric.

For a better understanding of the invention, together with other and further objects thereof, reference is had to the following description, taken in connection with the accompanying drawings, and its scope will be pointed out in the appended claims.

Figure 1:
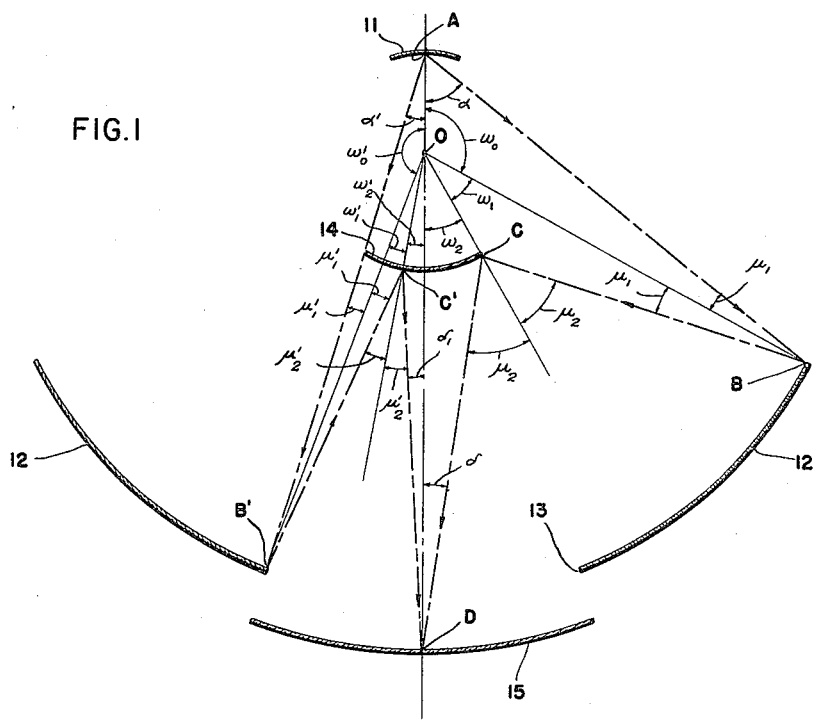
Fig. 1 is a diagrammatic illustration of a catoptric system in accordance with the present invention.

Having reference now to Fig. 1 of the drawings, there is illustrated an embodiment of the invention in its simplest form. The small spherical member 11 will be considered as the one having the object surface formed thereon. This object-surface member has a center of curvature O and the concave portion of this member comprises the object surface. A first reflecting member 12, with which the system is provided, has a spherical form the concave surface of which is conditioned for reflecting light. This reflecting member also has its center of curvature located at O and is mounted at a considerable distance from the object-surface member 11. If desired, it may be symmetrically disposed with reference to the central axis of the system running through the center of curvature of O and the central point A of the object-surface member 11. It also is provided with a circular aperture 13 which is centrally disposed in the reflecting member and symmetrically related to the central axis of the system.

A second reflecting member 14 is located between the center of curvature O and the concave reflecting member 12. The reflecting member 14 also is spherical, having its center of curvature at O and is provided with a light reflecting surface on the convex portion thereof. It likewise may be mounted as shown so that it is symmetrically disposed relative to the central axis of the optical system. The convex light reflecting surface of the member 14, therefore, faces the concave light reflecting surface of the member 12 and also the aperture 13 formed in the latter reflecting member.

Finally, there is provided an image-surface member 15 located in alignment with the aperture 13 of the concave reflecting member. The image-surface member 15 also is spherical, having its center of curvature at O and may be symmetrically disposed relative to the central optical axis at a distance from the center of curvature O dependent upon the degree of magnification desired. In one embodiment of the invention the object-surface member 11 may, for example, be opaque with the object being formed on the concave surface thereof, and the image-surface member 15 may be translucent as in the case where it is formed of ground glass or of similar material. In this manner the image may be viewed from the convex side of the image-surface member 15.

The essential requirement of an optical system in accordance with the instant invention is that all of the components thereof be spherical surfaces having a common center of curvature. In order that the object formed on the member 11 be sharply focused upon the member 15 it is necessary that the radii of the spherical components of the system bear the proper relationship to one another. There will be demonstrated presently one manner in which these radii may be computed to fulfill the focusing requirement. In general, the ratio of the radius of the member 15 to the radius of the member 11 will correspond to the order of magnification desired.

It has been found that with such a system it is possible to utilize a much greater percentage of light emanating from all parts of the object formed on the member 11 for the formation of an enlarged undistorted image on the member 15 than may be utilized in previously devised optical systems. In this explanation of the operation of the system two rays of the light emanating at a considerable angle relative to one another from the axial point A on the object member 11 will be traced. In the present instance these rays make angles with the central optical axis respectively of 40° and 20°. Other rays emanating at substantially any angles might be chosen for illustration and also for the computation to be set forth subsequently. However, in order to simplify the disclosure, the 40° and 20° rays have been selected both for illustration and for the computation.

A 40° ray may be traced from the axial point A of the object member 11 to the point B located at the outer edge of the concave reflecting member 12. It is then reflected to the point C located at the outer edge of the convex reflecting member 14 and from this point to the axial point D on the image member 15. Likewise, a 20° ray emanating from the axial point A on the object member 11 may be traced from this point past the outer edge of the convex reflecting member 14 to the point B' located at the edge of the aperture 13 formed in the concave reflecting member 12. It is then reflected to the point C' on the convex reflecting member 14 and from this point to the axial point D on the image member 15. It may be seen from this graphical illustration of two rays from the point A that they meet for all practical purposes at a common point D on the image member 15, indicating that all of the rays coming from the object point A at the two angles chosen for illustrative purposes are substantially in focus on the surface of the image member 15. Subsequently, it will be demonstrated that all other rays emanating from this point at angles having values between the values of these two angles also will be substantially in focus at the point D. Inasmuch as the system consists entirely of spherical surfaces all having the same center of curvature, it is evident that the light rays coming from all other points of the object member 11 at other angles to be reflected by the members 12 and 14 will be substantially in focus at corresponding points on the image member 15.

The following mathematical consideration of two light rays emanating from the point A at angles of 20° and 40° respectively will demonstrate the manner in which the radii of the spherical components of the system may be computed to secure the desired focusing of an enlarged undistorted image by means of an optical system embodying the present invention.

Let
$$OA = k$$
$$OC = a$$
$$OB = 1.0$$

Assume a magnification $m = 5$
Then $OD = mOA = 5k$
Consider first the 40° ray ABCD
In triangle OAB
$$\frac{k}{\sin \mu_1} = \frac{1}{\sin \alpha} \quad (1)$$

In triangle OBC
$$\frac{1}{\sin \mu_2} = \frac{a}{\sin \mu_1} \quad (2)$$

In triangle OCD
$$\frac{a}{\sin \delta} = \frac{5k}{\sin \mu_2} \quad (3)$$

Also,
In triangle OAB,
$$\alpha + \mu_1 = \pi - \omega_0 \quad (4)$$
In triangle OBC,
$$\pi - \mu_2 + \mu_1 = \pi - \omega_1 \quad (5)$$
In triangle OCD,
$$\pi - \mu_2 + \delta = \pi - \omega_2 \quad (6)$$
By adding Equations 4, 5 and 6 and taking into account that $\omega_0 + \omega_1 + \omega_2 = \pi$ there is obtained,
$$\alpha + 2\mu_1 - 2\mu_2 + \delta = 0 \quad (7)$$
Similarly, a corresponding system of equations may be written for the 20° ray AB'C'D as follows
$$\frac{k}{\sin \mu_1'} = \frac{1}{\sin \alpha'} \quad (8)$$
$$\frac{1}{\sin \mu_2'} = \frac{a}{\sin \mu_1'} \quad (9)$$

$$\frac{a}{\sin \delta'} = \frac{5k}{\sin \mu_2'} \quad (10)$$
$$\alpha' + 2\mu_1' - 2\mu_2' + \delta' = 0 \quad (11)$$

Thus, Equations 1, 2, 3, 7, 8, 9, 10 and 11 constitute a system of eight simultaneous equations by means of which solutions may be obtained for the eight unknowns $\mu_1$, $\mu_2$, $\delta$, $\mu_1'$, $\mu_2'$ $\delta'$, $k$ and "$a$." These equations may be solved exactly by the method of Newton in the case where the approximate values of the unknowns have been determined. However, for the present consideration they may be solved satisfactorily by series. The results of these computations are as follows:

When $\alpha = 40°$ and $k = 0.228205$, $a = 0.275824357$
When $\alpha' = 20°$ and $k = 0.228205$, $a = 0.275824378$ Hence, in the structure of Fig. 1, the radii of curvature of the optical system components are as follows:

$$OA = 0.228205$$
$$OB = 1.0$$
$$OC = 0.275824$$
$$OD = 5 \times OA = 1.141025$$

In such a system, it is apparent that the rays ABCD and AB'C'D of 40° and 20° respectively, emanating from the axial point A of the object-surface member 11 will be substantially in focus at the axial point D of the image-surface member 15, since these rays were considered in determining the radii of the optical components. Furthermore, it can be demonstrated that all intermediate rays likewise are substantially in focus at the point D.

Let $\rho = OD$, the distance from the center of curvature to the point at which any ray intercepts the central axis of the optical system. Then $d = \rho - 5k =$ the deviation from a theoretically perfect focus along the central axis.

From Equation 1
$$\sin \mu_1 = k \sin \alpha \quad (12)$$
From Equation 2
$$\sin \mu_2 = \frac{\sin \mu_1}{a} \quad (13)$$
From Equation 7
$$\delta = 2\mu_2 - 2\mu_1 - \alpha \quad (14)$$
From Equation 3
$$\rho = \frac{a \sin \mu_2}{\sin \delta} \quad (15)$$

Substituting $a \sin \mu_2 = \sin \mu_1$ from Equation 2 or 13 in Equation 15, there is obtained
$$\rho = \frac{\sin \mu_1}{\sin \delta} \quad (16)$$

The computed value of $k$ and the value of the sine of the assumed angle $\alpha$ are substituted in Equation 12 to give the value of sin $\mu_1$. This value and the computed value of "$a$" are then substituted in Equation 13 to give the value of sin $\mu_2$. The values of the angles $\mu_1$, $\mu_2$ and $\alpha$, when substituted in Equation 14 give the value of the angle $\delta$. Finally, the value of sin $\mu_1$ from Equation 12 and the value of the sine of angle $\delta$ from Equation 14 are substituted in Equation 16 to give the value of $\rho$.

Figure 2:
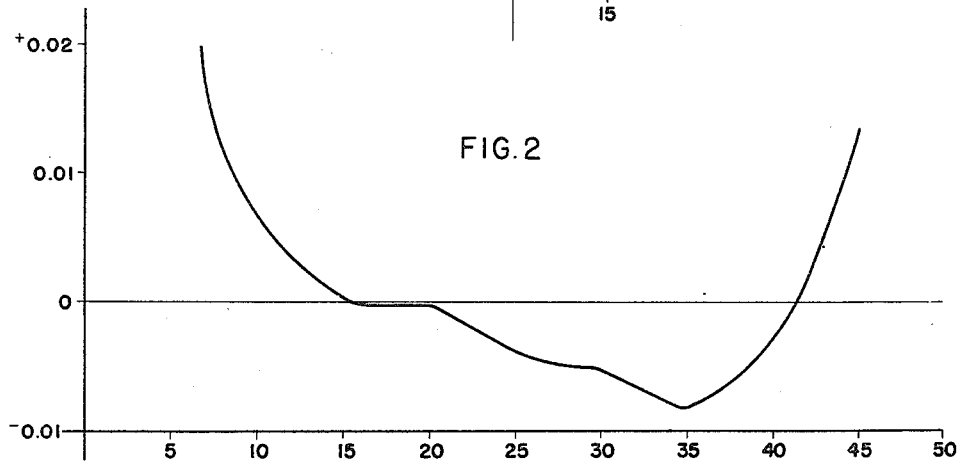
Fig. 2 is a graph illustrating the accuracy of focus which it is possible to achieve by means of the system illustrated in Fig. 1.

In Fig. 2 the values of $d = \rho - 5k$ for different values of the angle $\alpha$ have been plotted with the values of the angle $\alpha$ in degrees taken as abscissae and the values of $d$ in fractions of the radius OB as ordinates. It may be seen that, of the rays emanating from point A of the object-surface member 11 between the angles of 20° and 40°, the 35° ray has the maximum deviation, and that is less than 0.01 of the radius of the reflector 12. Therefore, an extremely good image is formed on the image-surface member 15 of all rays coming from the axial point A.

The components of the optical system are concentric spherical surfaces. Therefore, all of the rays emanating from all other points on the object-surface member 11 within a solid angle to be intercepted by the reflecting member 12 will be brought to a focus at corresponding points on the image-surface member 15.

As previously stated, an optical system in accordance with the present invention is reversible as in the case of most other optical systems. An object formed on the slightly concave surface of the member 15 may be demagnified by means of the system illustrated in Fig. 1. In this case an image will be formed on the concave surface of the member 11 having one-fifth of the size of the object.

The invention also may be embodied in an arrangement of the concentric spherical components in such a manner that it may be used as an astronomical telescope. In such case the equivalent of the member 15 will have a radius of curvature from the concentric point O of infinite length. It is apparent that such a device will have a very wide angle of view, of the order of 30°, which is considerably greater than in previously used optical systems, including the Schmidt system. The radii of curvature of the components 11, 12 and 14 may be computed by a system of simultaneous equations in a manner similar to that demonstrated in connection with the embodiment of Fig. 1. This computation may be made without further description by those skilled in the art. For the present purposes, therefore, it is considered sufficient to specify only the results of such a computation. The radius OA is 0.336225, the radius OB is 1.0, the radius OC is 0.402442 and the radius OD is infinity.

It, therefore, is apparent that a system in accordance with the instant invention is susceptible of use for projecting an enlarged image of practically any desired size upon a viewing screen of appropriate dimensions located at substantially any desired distance from the object commensurate with the amount of light brilliance of the object. Such a device then is one which may be used to good advantage for the projection of an enlarged television image onto a viewing screen located either in the same cabinet with the receiving apparatus or upon a remote screen detached from the receiver cabinet.

Figure 3:
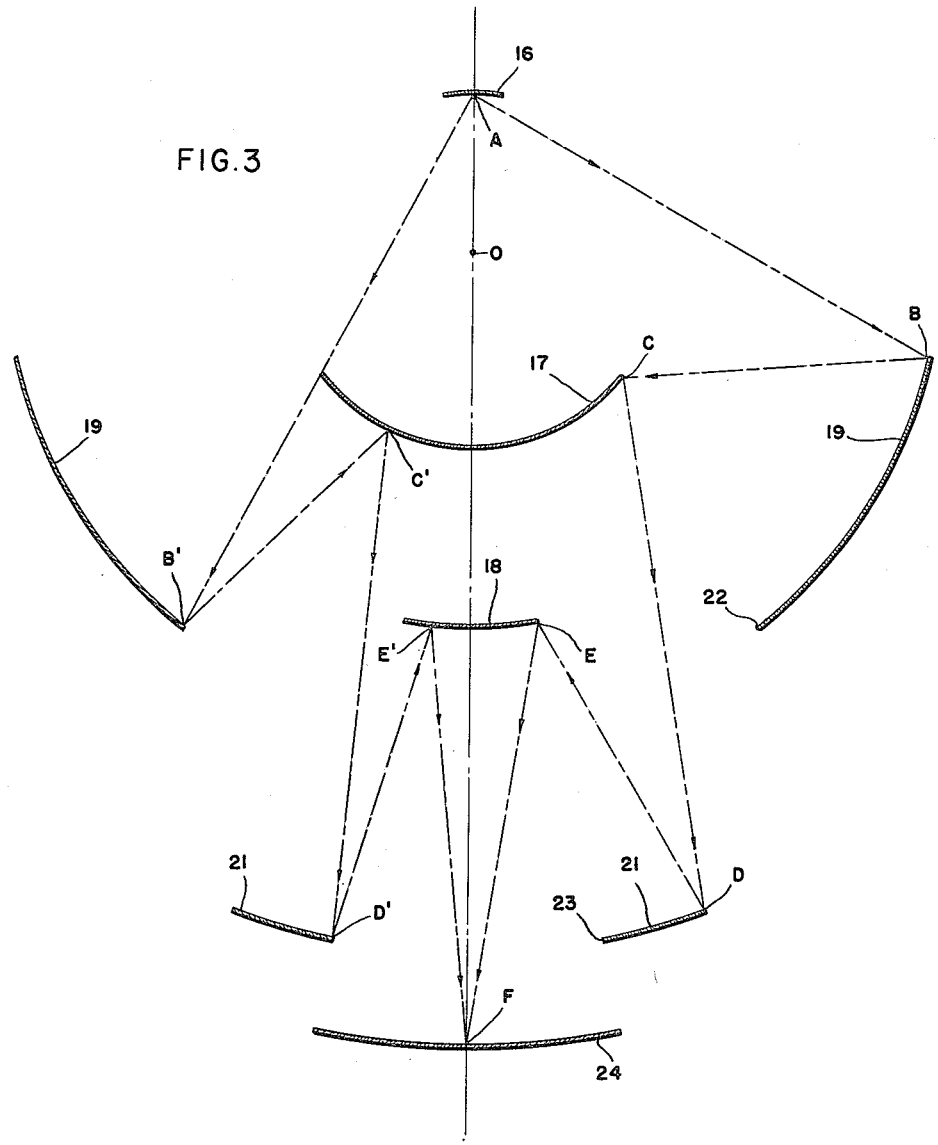
Fig. 3 is a schematic illustration of another form of the catoptric system embodying the present invention.

The principles underlying the present invention are such that embodiments of the invention are not limited to systems including only two optical surface members. On the contrary, a plurality of pairs of such members may be employed and in some instances to greater advantage. Fig. 3 illustrates diagrammatically one such system employing two pairs of reflecting members. The system shown in this figure is not necessarily drawn to scale but is included herein by way of illustration of an extension of the basic principles of the invention. It is contemplated that, with the detailed disclosure made in connection with Fig. 1 and the manner in which the computations may be made, it is within the skill of those versed in the art to apply these teachings to a system such as that shown in Fig. 3. This system includes a plurality of concentric spherical components which may be symmetrically related to the central axis of the system as in the previously described embodiment. The center of curvature of these surfaces is at O. There is provided a concave spherical object-surface member 16. The spherical reflecting members 17 and 18 located at different distances from the center of curvature O are conditioned for the reflection of light on the respective convex surfaces thereof. The light reflecting members 19 and 21 are conditioned to reflect light from the respective concave surfaces thereof. Also, the concave light reflecting members 19 and 21 are provided respectively with centrally located circular apertures 22 and 23. Finally, there is provided a viewing screen or image-surface member 24 located in substantial alignment with the aperture 23.

As illustrated in Fig. 3, one extreme angular ray emanating from the axial point A of the object-surface member 16 traverses the path ABCDEF, being reflected in order from the reflecting members 19, 17, 21 and 18 to the axially located point F on the image surface member 24. In like manner the light emanating from the point A at the other extreme angle is reflected by the four reflecting components and traverses a path AB'C'D'E'F to the image surface member 24.

An advantage of the system embodying the present invention which includes a plurality of pairs of reflecting members is that it presents more design possibilities. There are a larger number of variables and the arrangement of the system components is therefore considerably more flexible than a system embodying fewer components.

Figure 4:
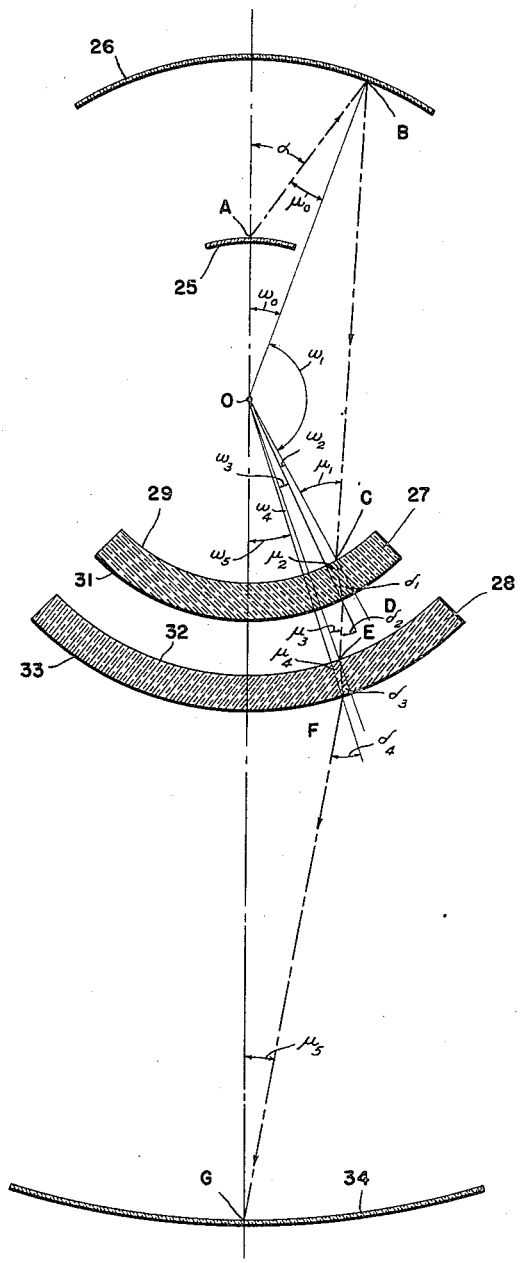
Fig. 4 illustrates diagrammatically the general form of a catadioptric system embodying the invention.

Reference will now be made to Fig. 4 which shows the general case of a catadioptric system embodying the present invention. This system comprises a convex substantially spherical object-surface member 25. Facing the object-surface member is a concave substantially spherical reflecting member 26. The members 25 and 26 are located in spaced relationship to one another and have substantially the same center of curvature O but different radii. On the other side of the center of curvature O from the members 25 and 26 there is located a plurality of concavo-convex substantially spherical refracting members such as the lenses 27 and 28. The concave surface 29 and the convex surface 31 of the lens 27, together with the concave surface 32 and the convex surface 33 of the lens 28 are substantially spherical and have the common center of curvature O, each of the surfaces however having a different radius. Finally, there is located a concave substantially spherical image-surface member 34 located in spaced relationship to the lenses 27 and 28 and on the opposite side thereof from the center of curvature O.

A substantial portion of the light emanating from the convex surface of the object-surface member 25 is reflected from the concave surface of the reflecting member 26 and is successively refracted by the respective lenses 27 and 28 to impinge upon the concave surface of the image-surface member 34. By a suitable computation of the respective radii of the substantially spherical optical surfaces with which the components of the system are provided, a practically perfect image may be formed on the image-surface member 34 of the subject matter constituting the light emanating from the object-surface member 25. The path of a typical ray of light emanating from the central axis point A of the object-surface member 25 is illustrated. The path of such a light ray is ABCDEFG. It is seen that this ray intercepts the central optical axis of the system substantially at the point G of the image-surface member 34 which lies on this axis. It will be demonstrated subsequently that all rays of light emanating from the point A on the member 25 within a relatively large solid angle are converged by means of the spherical optical surface members substantially at the point G of the image-surface member 34. This point, then, is for all practical purposes in perfect focus. Likewise, because of the symmetry of the system wherein all of the optical surface members are concentric spheres, it will be evident that the light emanating from all of the points of the object-surface member 25 will be in focus at corresponding points on the image-surface member 34.

One method of computing a catadioptric system in accordance with the present invention is outlined for the general case in which the system comprises a concave spherical reflecting member and a plurality of spherical refracting members. For the immediately following consideration two refracting members 27 and 28 as shown in Fig. 4 are used to formulate the general equations. Subsequently, there will be demonstrated one method of solving the general equations for a special case in which only one refracting member is embodied in the system. The solution of these equations gives the radii of the spherical surfaces comprising a catadioptric system according to the instant invention.

Let
$$OA = k$$
$$OB = 1.0$$
$$OC = a_1$$
$$OD = a_2$$
$$OE = a_3$$
$$OF = a_4$$
$$m = \text{magnification factor}$$

Then
$$OG = mk$$

Consider any ray AB emanating from the axial point A on the object-surface member 25 at an angle $\alpha$ with the normal through the point A from the center of curvature O of the spherical surfaces including the convex surface of the object-surface member.

Let $\omega_0$, $\omega_1$, $\omega_2$, $\omega_3$, $\omega_4$ and $\omega_5$ indicate the respective angles between adjacent normals through the center O and the respective points of incidence of the ray ABCDEFG on the spherical surfaces 25, 26, 29, 31, 32, 33 and 34.

Let $\mu_0$, $\mu_1$, $\mu_2$, $\mu_3$, $\mu_4$ and $\mu_5$ represent the respective angles of incidence of the light ray on the spherical surfaces 26, 29, 31, 32, 33 and 34.

Let $\delta_1$, $\delta_2$, $\delta_3$ and $\delta_4$ represent the respective angles of refraction of the light ray in passing the spherical refracting surfaces 29, 31, 32 and 33.

In triangle OAB
$$\frac{k}{\sin(\alpha - \omega_0)} = \frac{1}{\sin \alpha} \tag{1}$$

In triangle OBC
$$\frac{1}{\sin \mu_1} = \frac{a_1}{\sin(\alpha - \omega_0)} \tag{2}$$

In triangle OCD
$$\frac{a_1}{\sin \mu_2} = \frac{a_2}{\sin \delta_1} \tag{3}$$

In triangle ODE
$$\frac{a_2}{\sin \mu_3} = \frac{a_3}{\sin \delta_2} \tag{4}$$

In triangle OEF
$$\frac{a_3}{\sin \mu_4} = \frac{a_2}{\sin \delta_3} \tag{5}$$

In triangle OFG
$$\frac{a_4}{\sin \mu_5} = \frac{mk}{\sin \delta_4} \tag{6}$$

Also assume $n$ = the index of refraction of the material comprising the refracting surface members 27 and 28. Then the following relationship exists between corresponding angles of incidence and refraction of the light ray at the spherical refracting surfaces 29, 31, 32 and 33:

At the surface 29,
$$\sin \mu_1 = n \sin \delta_1 \tag{7}$$
At the surface 31,
$$n \sin \mu_2 = \sin \delta_2 \tag{8}$$
At the surface 32,
$$\sin \mu_3 = n \sin \delta_3 \tag{9}$$
At the surface 33,
$$n \sin \mu_4 = \sin \delta_4 \tag{10}$$

Furthermore,

In triangle OAB,
$$-\omega_0 = -\omega_0 \tag{11}$$
In triangle OBC,
$$\pi - \omega_1 = \alpha - \omega_0 + \mu_1 \tag{12}$$
In triangle OCD,
$$\pi - \omega_2 = \pi - \delta_1 + \mu_2 \tag{13}$$
In triangle ODE,
$$\pi - \omega_3 = \pi - \delta_2 + \mu_3 \tag{14}$$
In triangle OEF,
$$\pi - \omega_4 = \pi - \delta_3 + \mu_4 \tag{15}$$
In triangle OFG,
$$\pi - \omega_5 = \pi - \delta_4 + \mu_5 \tag{16}$$

By adding Equations 11 through 16 and taking into account that $$\omega_0 + \omega_1 + \omega_2 + \omega_3 + \omega_4 + \omega_5 = \pi$$

there is obtained, $$\alpha + \mu_1 - \delta_1 + \mu_2 - \delta_2 + \mu_3 -$$
$$\delta_3 + \mu_4 - \delta_4 + \mu_5 - 2\omega_0 = 0 \tag{17}$$

Let $\rho$ = the distance from the center of curvature O to the point at which the ray ABCDEFG intercepts the central axis of the system. Equations 1 through 10 together with Equation 17 may be said to determine the light ray corresponding to any value of $\omega_0$. If $k$, $a_1$, $a_2$, $a_3$, and $a_4$ were known and if Equation 6 be written in the form $$\frac{a_4}{\sin \mu_5} = \frac{\rho}{\sin \delta_4} \tag{6'}$$

the value of $\rho$ could be determined because there is a system of eleven simultaneous equations involving the eleven unknowns.

If, however, there be imposed the condition that $\rho = mk$ and if $k$, $a_1$, $a_2$, $a_3$, and $a_4$ be considered as unknowns, it is evident that by taking five different values of $\omega_0$ (i. e., five light rays) the values of $k$, $a_1$, $a_2$, $a_3$, and $a_4$ may be determined, whereby the five light rays which emanate from the point A on the object-surface member 25 will converge at the point G on the image-surface member 34.

The Equations 1 through 10 and 17 may be rewritten as follows, taking into account that $$\alpha = \mu_0 + \omega_0$$

$$\left.\begin{array}{l}
E_1 \equiv k \sin \alpha - \sin \mu_0 = 0 \\
E_2 \equiv \sin \mu_0 - a_1 \sin \mu_1 = 0 \\
E_3 \equiv \sin \mu_1 - n \sin \delta_1 = 0 \\
E_4 \equiv a_1 \sin \delta_1 - a_2 \sin \mu_2 = 0 \\
E_5 \equiv n \sin \mu_2 - \sin \delta_2 = 0 \\
E_6 \equiv a_2 \sin \delta_2 - a_3 \sin \mu_3 = 0 \\
E_7 \equiv \sin \mu_3 - n \sin \delta_3 = 0 \\
E_8 \equiv a_3 \sin \delta_3 - a_4 \sin \mu_4 = 0 \\
E_9 \equiv n \sin \mu_4 - \sin \delta_4 = 0 \\
E_{10} \equiv a_4 \sin \delta_4 - mk \sin \mu_5 = 0 \\
E_{11} \equiv \mu_0 - \alpha + \omega_0 = 0 \\
E_{12} \equiv \alpha + \mu_1 - \delta_1 + \mu_2 - \delta_2 + \mu_3 - \\
\qquad \delta_3 + \mu_4 - \delta_4 + \mu_5 - 2\omega_0 = 0
\end{array}\right\} \quad (18)$$

The Equations 18 may be solved to determine the unknowns for the general case wherein a plurality of spherical refracting members is employed in the manner set forth hereinafter for a special case wherein only one refracting member is used. Assume that the system is substantially as shown in Fig. 4 except that only the one refracting member 27 is included. In this case the following equations may be written:

$$\left.\begin{array}{l}
E_1 \equiv k \sin \alpha - \sin \mu_0 = 0 \\
E_2 \equiv \sin \mu_0 - a_1 \sin \mu_1 = 0 \\
E_3 \equiv \sin \mu_1 - n \sin \delta_1 = 0 \\
E_4 \equiv a_1 \sin \delta_1 - a_2 \sin \mu_2 = 0 \\
E_5 \equiv n \sin \mu_2 - \sin \delta_2 = 0 \\
E_6 \equiv a_2 \sin \delta_2 - mk \sin \mu_3 = 0 \\
E_7 \equiv \mu_0 - \alpha + \omega_0 = 0 \\
E_8 \equiv \alpha + \mu_1 - \delta_1 + \mu_2 - \delta_2 + \mu_3 - 2\omega_0 = 0
\end{array}\right\} \quad (19)$$

If three values of $\omega_0$ be assumed, then two additional systems of Equations 19' and 19'' may be written similar to the Equations 19. In all three systems the unknowns $k$, $a_1$ and $a_2$ will be the same. However, the other unknowns will be different for each assumed value of $\omega_0$. These two additional systems of equations are as follows:

$$\left.\begin{array}{l}
E_1' \equiv k \sin \alpha' - \sin \mu_0' = 0 \\
E_2' \equiv \sin \mu_0' - a_1 \sin \mu_1' = 0 \\
E_3' \equiv \sin \mu_1' - n \sin \delta_1' = 0 \\
E_4' \equiv a_1 \sin \delta_1' - a_2 \sin \mu_2' = 0 \\
E_5' \equiv n \sin \mu_2' - \sin \delta_2' = 0 \\
E_6' \equiv a_2 \sin \delta_2' - mk \sin \mu_3' = 0 \\
E_7' \equiv \mu_0' + \alpha' + \omega_0' = 0 \\
E_8' \equiv \alpha' + \mu_1' - \delta_1' + \mu_2' - \delta_2' + \mu_3' - 2\omega_0' = 0
\end{array}\right\} \quad (19')$$

and $$\left.\begin{array}{l}
E_1'' \equiv k \sin \alpha'' - \sin \mu_0'' = 0 \\
E_2'' \equiv \sin \mu_0'' - a_1 \sin \mu_1'' = 0 \\
E_3'' \equiv \sin \mu_1'' - n \sin \delta_1'' = 0 \\
E_4'' \equiv a_1 \sin \delta_1'' - a_2 \sin \mu_2'' = 0 \\
E_5'' \equiv n \sin \mu_2'' - \sin \delta_2'' = 0 \\
E_6'' \equiv a_2 \sin \delta_2'' - mk \sin \mu_3'' = 0 \\
E_7'' \equiv \mu_0'' - \alpha'' + \omega_0'' = 0 \\
E_8'' \equiv \alpha'' + \mu_1'' - \delta_1'' + \mu_2'' - \delta_2'' + \mu_3'' - 2\omega_0'' = 0
\end{array}\right\} \quad (19'')$$

The three systems of Equations 19, 19' and 19'' are in effect a single system of twenty-four simultaneous equations involving the twenty-four unknowns $k$, $a_1$, $a_2$, $\alpha$, $\mu_0$, $\mu_1$, $\mu_2$, $\mu_3$, $\delta_1$, $\delta_2$, $\alpha'$, $\mu_0'$, $\mu_1'$, $\mu_2'$, $\mu_3'$, $\delta_1'$, $\delta_2'$, $\alpha''$, $\mu_0''$, $\mu_1''$, $\mu_2''$, $\mu_3''$, $\delta_1''$ and $\delta_2''$. These equations have been found not to have real roots. The problem, however, may be solved by treating it as one of maxima and minima.

For the first ray corresponding to $\omega_0$ let $OG = \rho$
For the second ray corresponding to $\omega_0'$ let $OG = \rho'$
For the third ray corresponding to $\omega_0''$ let $OG = \rho''$ In order for all three rays to converge substantially at the point G on the image-surface member 34 it is necessary that $$(\rho - mk)^2 + (\rho' - mk)^2 + (\rho'' - mk)^2$$

be a minimum.

In order to make the form of the Equations 19, 19' and 19'' simpler for solution let $$\begin{array}{lll}
x_1 = \sin \alpha & x_1' = \sin \alpha' & x_1'' = \sin \alpha'' \\
x_2 = \sin \mu_0 & x_2' = \sin \mu_0' & x_2'' = \sin \mu_0'' \\
x_3 = \sin \mu_1 & x_3' = \sin \mu_1' & x_3'' = \sin \mu_1'' \\
x_4 = \sin \delta_1 & x_4' = \sin \delta_1' & x_4'' = \sin \delta_1'' \\
x_5 = \sin \mu_2 & x_5' = \sin \mu_2' & x_5'' = \sin \mu_2'' \\
x_6 = \sin \delta_2 & x_6' = \sin \delta_2' & x_6'' = \sin \delta_2'' \\
x_7 = \sin \mu_3 & x_7' = \sin \mu_3' & x_7'' = \sin \mu_3''
\end{array}$$

The system of Equations 19, then becomes $$\left.\begin{array}{l}
E_1 \equiv kx_1 - x_2 = 0 \\
E_2 \equiv x_2 - a_1 x_3 = 0 \\
E_3 \equiv x_3 - nx_4 = 0 \\
E_4 \equiv a_1 x_4 - a_2 x_5 = 0 \\
E_5 \equiv nx_5 - x_6 = 0 \\
E_6 \equiv a_2 x_6 - \rho x_7 = 0 \\
E_7 \equiv \arcsin x_2 - \arcsin x_1 + \omega = 0 \\
E_8 \equiv \arcsin x_1 + \arcsin x_3 - \arcsin x_4 + \arcsin x_5 - \arcsin x_6 + \arcsin x_7 - 2\omega_0 = 0
\end{array}\right\} \quad (20)$$

The system of Equations 19' becomes $$\left.\begin{array}{l}
E_1' \equiv kx_1' - x_2' = 0 \\
E_2' \equiv x_2' - a_1 x_3' = 0 \\
E_3' \equiv x_3' - nx_4' = 0 \\
E_4' \equiv a_1 x_4' - a_2 x_5' = 0 \\
E_5' \equiv nx_5' - x_6' = 0 \\
E_6' \equiv a_2 x_6' - \rho' x_7' = 0 \\
E_7' \equiv \arcsin x_2' - \arcsin x_1' + \omega_0' = 0 \\
E_8' \equiv \arcsin x_1' + \arcsin x_3' - \arcsin x_4' + \arcsin x_5' - \arcsin x_6' + \arcsin x_7' - 2\omega_0' = 0
\end{array}\right\} \quad (20')$$

The system of Equations 19'' becomes $$\left.\begin{array}{l}
E_1'' \equiv kx_1'' - x_2'' = 0 \\
E_2'' \equiv x_2'' - a_1 x_3'' = 0 \\
E_3'' \equiv x_3'' - nx_4'' = 0 \\
E_4'' \equiv a_1 x_4'' - a_2 x_5'' = 0 \\
E_5'' \equiv nx_5'' - x_6'' = 0 \\
E_6'' \equiv a_2 x_6'' - \rho'' x_7'' = 0 \\
E_7'' \equiv \arcsin x_2'' - \arcsin x_1'' + \omega_0'' = 0 \\
E_8'' \equiv \arcsin x_1'' + \arcsin x_3'' - \arcsin x_4'' + \arcsin x_5'' - \arcsin x_6'' + \arcsin x_7'' - 2\omega_0'' = 0
\end{array}\right\} \quad (20'')$$

Let $$E_9 \equiv S - (\rho - mk)^2 - (\rho' - mk)^2 - (\rho'' - mk)^2 = 0 \quad (21)$$

It is necessary, therefore, to compute the values of $k$, $a_1$ and $a_2$ so that $S$ is a minimum.

The conditions for S to be a maximum or a minimum are that $$\frac{\delta S}{\delta k}=0, \frac{\delta S}{\delta a_1}=0 \text{ and } \frac{\delta S}{\delta a_2}=0$$

These quantities can be expressed in the form of determinants. The conditions for minimum are that the numerator determinants be equal to zero.

Based on the Equations 20, 20', 20'' and 21 the first determinant is:

$$\begin{vmatrix} \frac{\delta E_1}{\delta x_1} & \frac{\delta E_1}{\delta x_2} & \cdots & \frac{\delta E_1}{\delta x_7} & \frac{\delta E_1}{\delta \rho} & \frac{\delta E_1}{\delta x_1'} & \cdots & \frac{\delta E_1}{\delta \rho''} & \frac{\delta E_1}{\delta k} \\ \cdots \\ \frac{\delta E_1'}{\delta x_1} & & & & & & & & \\ \cdots \\ \frac{\delta E_5'}{\delta x_1} & & & & & & & & \frac{\delta E_5'}{\delta k} \\ \cdots \\ \frac{\delta E_1''}{\delta x_1} & & & & & & & & \frac{\delta E_1''}{\delta k} \\ \cdots \\ \frac{\delta E_5''}{\delta x_1} & & & & & & & & \frac{\delta E_5''}{\delta k} \\ \cdots \\ \frac{\delta E_9}{\delta x_1} & \frac{\delta E_9}{\delta x_2} & & & & & & & \frac{\delta E_9}{\delta k} \end{vmatrix}$$

This determinant has twenty-five rows and twenty-five columns. The second determinant is similar to the first determinant except that in the last or right hand column there are substituted the derivatives $$\frac{\delta E_1}{\delta a_1}$$
$$\vdots$$
$$\frac{\delta E_9}{\delta a_1}$$

Likewise, the third determinant is similar to the first determinant except that in the last column there are substituted the derivatives $$\frac{\delta E_1}{\delta a_2}$$
$$\vdots$$
$$\frac{\delta E_9}{\delta a_2}$$

Let $\Delta_1$ represent the first determinant, $\Delta_2$ the second determinant and $\Delta_3$ the third determinant. Then, there may be written the following equations:

$$\left.\begin{array}{l} E_{10} \equiv \Delta_1 = 0 \\ E_{11} \equiv \Delta_2 = 0 \\ E_{12} \equiv \Delta_3 = 0 \end{array}\right\} \quad (22)$$

The system of Equations 20, 20', 20'' together with 22 will thus enable the determination of $k$, $a_1$ and $a_2$. These equations may be solved by the well-known method of Newton when a preliminary solution has been determined graphically or by equivalent means.

Figure 5:
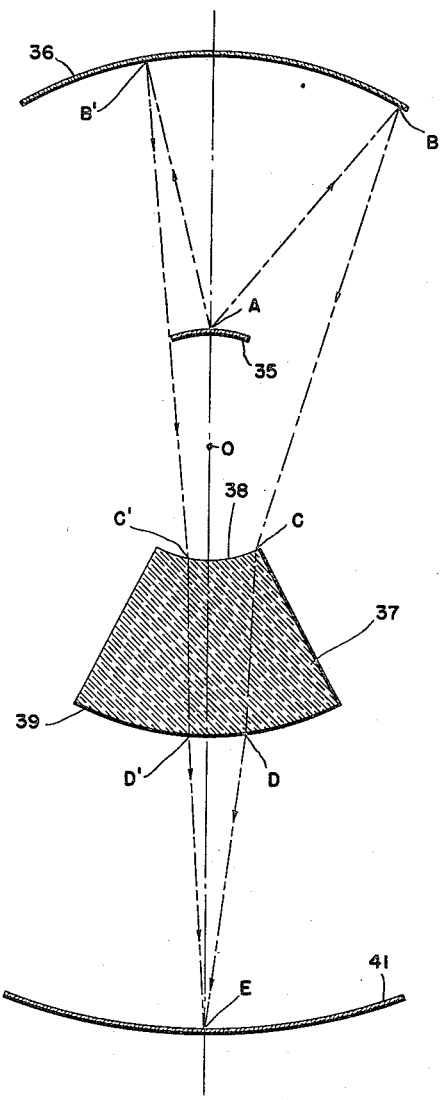
Fig. 5 is a schematic representation of a special form of catadioptric system in accordance with the invention; and, Fig. 6 illustrates an embodiment of the invention in a television projection receiver employing a cathode ray image reproducing tube.

Referring now to Fig. 5 of the drawings, there is shown a catadioptric system embodying the present invention which includes a single spherical refracting member. The components of this system have been arranged substantially to scale. The radii of the respective spherical optical surfaces have been computed substantially in the manner outlined previously.

The system consists of a convex substantially spherical object-surface member 35 having a center of curvature O. Facing the convex surface of the object-surface member is located a concave substantially spherical reflecting member 36. The radius of curvature for the reflecting member also is at the point O. In addition, there is provided a refracting member 37 which is located on the opposite side of the point from the members 35 and 36. The refracting member is provided with a concave substantially spherical optical surface 38 and a convex substantially spherical optical surface 39. Both of these optical surfaces are substantially spherical and have the point O as their center of curvature. Finally, there is located a concave substantially spherical image-surface member 41 so that it faces the convex optical surface 39 of the refracting member. The image surface member also has the same common center of curvature O. Preferably, as in other forms of the invention previously described, all of the components of the catadioptric system are symmetrically located with respect to the central axis of the system. In accordance with the computation of such a system, the following are the radii of the spherical optical surfaces of the components with the point O as a common center.

| | |
|---|---|
| Object-surface member 35 | 0.3 |
| Reflector 36 | 1.0 |
| Concave reflecting surface 38 | 0.287 |
| Convex refracting surface 39 | 0.75 |
| Image-surface member 41 | 1.5 |

In Fig. 5 there are shown the respective paths of two light rays emanating from the central axis point A on the object surface member 35. The ray emanating from point A at the greater angle may be traced along the path ABCDE. The other ray shown emanating from the point A at the lesser angle similarly may be traced along the path AB'C'D'E. It is seen that, after reflection by the member 36 and a double refraction by the member 37, both of these rays converge substantially at the central axial point E on the image-surface member 41. It has been determined that, in a manner similar to that outlined in connection with the description of Fig. 1, the rays of light emanating from the point A at angles having values between the two illustrated rays also converge substantially at the point E, indicating that the system is designed to focus with considerable accuracy between the points A and E. It also is evident by reason of the symmetry of the system, all optical surfaces being portions of concentric spheres, that all of the light rays emanating from all other points on the object-surface member 35 within a relatively large solid angle likewise will converge substantially at corresponding points on the image-surface member 41.

It should be readily apparent that a catadioptric system substantially in accordance with the teachings of the instant invention may be adapted for use for any desired purpose. For example, it is particularly well suited for use in a television projection receiver. The object-surface member 35 in such a case would be the fluorescent screen formed on the end of a conventional cathode ray tube. A light image of the picture to be projected may be formed on the fluorescent screen in a conventional manner such as by scanning with an electron beam. The screen onto which the enlarged image of the picture produced on the object-surface member 35 representing the fluorescent screen of a cathode ray tube may be the image surface member 41. Also, if desired to produce an enlarged substantially undistorted picture on a flat screen a flattening lens may be introduced on the light path between the convex surface 39 of the refracting member 37 and the screen.

An embodiment of the present invention in a television receiver is shown in Fig. 6. The television receiver apparatus is housed in a cabinet 42 which is provided with a horizontal shelf 43 upon which is mounted a receiver chassis 44. A loud speaker 45 for the reproduction of the sound accompanying the television picture is mounted in the front wall of the cabinet in registry with an opening 46 formed in the cabinet wall.

A cathode ray tube 47 which is provided with a relatively small substantially spherical concave end wall having formed on the interior surface thereof a fluorescent screen 48 is mounted in the cabinet in any conventional manner (not shown). There also is mounted on another horizontal shelf 49 of the cabinet a supporting standard 51 for an aplanatic optical member 52. This member is provided with a rear wall 53, the outside surface of which has a substantially spherical convex curvature conforming to the concave curvature of the end wall of the cathode ray tube 47. The aplanatic member also is provided with a substantially spherical front wall 54 which has a radius of curvature as more specifically defined hereinafter and has a purpose to be described. The aplantic member 52 is of such a character that the medium intervening between the rear and front walls 53 and 54 thereof has the same refractive index as these walls which also corresponds to the refractive index of the end wall of the cathode ray tube. As illustrated, the aplanatic member may comprise a glass or plastic shell which is completely filled with a liquid having the same index of refraction as the shell material. Alternatively, the aplanatic member may be formed of a solid material having a refractive index corresponding to that of the cathode ray tube end wall.

In the front wall of the cabinet 42 there is formed an annular aperture 55 at the center of which there is mounted a convex substantially spherical reflecting member 56. The convex reflecting member may be supported by means of a spider construction which will obstruct a minimum of light. Such a construction is well known and, therefore, has not been shown in detail. The center of curvature of the outside or convex surface of the reflecting member 56 is at O which also is the center of curvature of the concave end wall of the cathode ray tube 47, the spherical rear wall 53 and the spherical front wall 54 of the aplanatic member 52.

The remainder of the projection system is mounted outside of the receiver cabinet and is spaced a suitable distance therefrom. These components comprise a concave substantially spherical reflecting member 57 having the common center of curvature O and being provided with a centrally disposed circular aperture 58. The concave reflecting member 57 may for example be formed in a side wall of the room in which the receiver cabinet 42 is located. A projection screen 59 upon which the enlarged television image is projected is mounted in the present instance behind the concave reflecting member 57 in line with the aperture 58 thereof. The screen is supported in spaced relationship to the reflecting member 57 by a plurality of brackets such as 61. Additional support may be provided for the screen structure by a standard 62 mounted on the floor or any other suitable fixed structure. The projection screen 59 is substantially spherical and has the common center of curvature O.

The operation of the described optical system embodied in a television receiver is quite similar to the operation of the other described embodiments of the present invention. In effect, the present system is essentially the same as the catoptric system illustrated diagrammatically in Fig. 1. However, in order to obtain the optimum angle of light utilization and, incidentally, to enable the use of components somewhat reduced in size from those theoretically required, the aplanatic sphere 25 is employed. This component operates in a manner to be described principally to enable the reduction in the size of the concave spherical reflector 57.

A light ray emanating from any point such as the central axial point A on the fluorescent screen will travel in a straight line from the point A to a point such as B at which it is incident upon the external spherical surface of the front wall 54 of the aplanatic member. This may be understood by considering the fact that the path of any light ray from the fluorescent screen to the front surface of the wall 54 of the aplanatic member is through a medium or media having a predetermined refractive index. If, as described, the aplanatic member 52 is made entirely of glass or other refractive material, it is obvious that the refractive index of the medium through which the light ray AB passes is uniform. Similarly if, as described, a glass or plastic shell is filled with a liquid having the same refractive index as the shell material, the portion AB of the light ray also passes through media having the same refractive index and, therefore, travels in a straight line. Upon passing from the medium of the aplanatic member into the rarer medium of air at a point such as B, the light ray is refracted as indicated by the line BC. The same condition exists for every other light ray emanating from the point A or from any other point on the fluorescent screen 48 of the cathode ray tube. Considering first only the light rays emanating from the point A, two of which AB and AB' are illustrated, it is seen that the backward projections of the refracted paths of these rays BC and BC' respectively converge at the point A' which is located on the central optical axis running through the points O and A. Similarly, convergence of the light rays emanating from all other points on the fluorescent screen will be effected at corresponding points on an imaginary spherical surface having O as its center. In effect, therefore, by this means there is produced a somewhat enlarged virtual image 63 of the fluorescent screen 48. The effect of the creation of this virtual image is that for the reflecting components of the catoptric system the light rays impinging upon these reflectors and ultimately upon the projection screen 59 is that they emanate from the various points on the virtual image. The reflecting system, therefore, is designed in the manner set forth in the description of Fig. 1 by treating the virtual image 63 as the substantially spherical object-surface member.

In the embodiment of the system illustrated in Fig. 6 the following dimensions of the optical components are given for a typical example of a system of the character comprising the subject matter of this invention, whereby there may be produced on a viewing screen a considerably enlarged substantially undistorted image of a television picture formed on the fluorescent screen of a television image reproducing tube.

Diameter of screen 48=3.00 inches
OA=8.80 inches
OA'=19.12 inches
OB=12.97 inches
OC=83.79 inches
OD=23.12 inches
OE=95.60 inches Refractive index of member 52=1.474

It may be seen by inspection of Fig. 6 that two light rays emanating from the point A on the fluorescent screen 48 of the cathode ray tube 47 follow paths which converge substantially at the point E on the projection screen 59. One extreme ray illustrated follows the path ABCDE. The other extreme ray illustrated follows the path AB'C'D'E. It will be understood that the angles, with respect to the central optical axis passing through points O and A, at which these light rays emanate from the point A, have been chosen somewhat arbitrarily merely for illustrative purposes. The ray AB, for example, makes an angle of approximately 45° with the central optical axis, and the ray AB' an angle of approximately 15°. The useful light therefore is that contained in the solid angle made by revolving the line AB around the axis OA from which is subtracted the light emanating from the point A within the solid angle formed by revolving the line OB' about the axial line OA. It is obvious that, if it is desired to utilize more of the available light, the front surface 54 of the aplanatic member 52 may be extended farther in the direction of the cathode ray tube 47. By this means then the light emanating from the point A at angles greater than 45° relative to the axis OA may be used for projecting an enlarged image upon the screen 59.

As illustrated, however, it is readily seen that, if the 45° ray OB is employed directly without refraction by the aplanatic member 52, a concave reflecting member such as 57 would be required of considerably greater surface area. Specifically, the surface would have to be extended more in the direction toward the light source than in the illustrated case. The use of the aplanatic member 52, however, by refracting the light rays as shown has the effect of making it appear that the ray BC which is reflected from the outer extremity of the spherical reflecting member 57 emanates from the point A' on the virtual image 63 at an angle of approximately 30° relative to the axial line OA'. Obviously, by suitable proportioning of the aplanatic member 52, the apparent angle of emergence of any light ray may be changed appreciably and, therefore, the proportions of the reflecting members such as 56 and 57 will also be changed. Obviously, of course, the other components of the optical system will change correspondingly, but to a much lesser degree than in the case of the concave reflector 57.

It also should be obvious that an optical system embodying the principles of the present invention may be designed so that the image-surface member such as the screen 59 is co-extensive with the concave reflector 57, or if desired, it may be located between the reflecting members 56 and 57. The principal feature determining the position of the image-surface member such as the screen 59 relative to the concave reflector 57 is the degree of magnification of the image produced upon the object-surface member such as the fluorescent screen 48 of the cathode ray tube 47. Different degrees of magnification of the image to be projected require a considerable change of the radius OE of the screen 59 but require but very little change in the radii OC and OD of the reflecting members 57 and 56, respectively.

It is apparent that a projection system embodying the present invention in any of its illustrated forms, particularly the embodiment shown in Fig. 6 is applicable not only to television home receivers but also for the projection of enlarged television pictures upon screens in theatres or similar locations for viewing by large numbers of spectators. The relatively wide angle property of an optical system according to this invention, together with its symmetrical character, enables the use of the available light to a much higher efficiency than heretofore obtainable for the production of enlarged substantially undistorted images. Systems incorporating the principles of the present invention, for example, may be designed so as to have a large enough aperture relative to the focal length to be the equivalent of an f/.21 optical system which is capable of producing a substantially undistorted image magnified to substantially any desired degree.

There have been disclosed herein a catoptric, or all-reflecting, system and a catadioptric, or part reflecting and part refracting system. The common characteristic features of these systems is the concentricity of the plurality of spherical optical surfaces used. Obviously, a dioptric, or all refracting, system having the characteristic of concentric spherical optical surfaces is another species of the generic invention. Accordingly, it is contemplated that this species be construed as within the scope of the instant invention.

All forms of the invention including those disclosed herein for illustrative purposes obviously are susceptible of use in combination with other optical components where it is desired to achieve special results or effects. For example, a refraction device such as a lens may be incorporated between the last spherical optical surface-member and the image-surface member to flatten the image, whereby to enable the use of a plane image-surface member.

While there have been described what, at present, are considered typical illustrative embodiments of the invention, it will be obvious to those skilled in the art that various changes and modifications may be made therein without departing from the invention, and therefore, it is aimed in the appended claims to cover all such changes and modifications as fall within the true spirit and scope of the invention.

What is claimed is:

1. An optical system consisting of a spherical object-surface member, a spherical image-surface member facing said object-surface member, and a plurality of spherical light reflecting members located in the light path between said object-surface and said image-surface members, the spherical surfaces of all of said members having substantially the same center of curvature.

2. An optical system comprising, a concave spherical object-surface member, a concave spherical image-surface member facing said object-surface member, a first spherical light reflecting member facing said object-surface member, and a second spherical light reflecting member facing said first light reflecting member and said image-surface member, the spherical surfaces of all of said members having substantially the same center of curvature.

3. An optical system comprising, a concave spherical object-surface member, a concave spherical image-surface member facing said object-surface member, a concave spherical light reflecting member facing said object-surface member and located between said object-surface and said image-surface members, said concave reflecting member having a centrally disposed circular aperture formed therein, and a convex spherical light reflecting member facing said concave light reflecting member and located between said object-surface member and said concave reflecting member, the spherical surfaces of all of said members having substantially the same center of curvature located between said object-surface member and said convex reflecting member.

4. An optical system consisting of a concave substantially spherical object-surface member, a concave substantially spherical image-surface member facing said object-surface member, a first plurality of substantially spherical light reflecting members facing said object-surface member, said reflecting members being located between and at different respective distances from said object-surface and said image-surface members, and a second plurality of substantially spherical light reflecting members located between said object-surface and said image-surface members, the spherical surfaces of said members all having substantially the same center of curvature.

5. An optical system consisting of a concave substantially spherical object-surface member, a concave substantially spherical image-surface member facing said object-surface member, a plurality of concave substantially spherical light reflecting members facing said object-surface member, said reflecting members being located between and at different respective distances from said object-surface and said image-surface members, said concave reflecting members having centrally disposed apertures formed therein, and a plurality of convex substantially spherical light reflecting members located between said object-surface and said image-surface members, the spherical surfaces of said members all having substantially the same center of curvature located between said object-surface member and the others of said members.

6. An optical system consisting of a concave substantially spherical object-surface member, a concave substantially spherical image-surface member facing said object-surface member, a plurality of concave substantially spherical light reflecting members facing said object-surface member, said reflecting members being located between and at different respective distances from said object-surface and said image-surface members, said concave reflecting members having centrally disposed circular apertures formed therein, and a plurality of convex substantially spherical light reflecting members equal in number to said concave reflecting members and located between said object-surface and said image-surface members, each of said convex reflecting members being positioned to face two of said concave members, one of which being a light reflecting member, the spherical surfaces of said members all having substantially the same center of curvature located between said object-surface member and the others of said members.

7. An optical system for television projection apparatus comprising, a cathode ray tube having an evacuated envelope provided with a transparent spherical end wall, a fluorescent screen formed on the inside of said tube end wall and adapted to have reproduced thereon an optical image by the deflection of an electron beam thereover, a spherical viewing screen facing said fluorescent screen, and a plurality of spherical light reflecting members located in the light path between said fluorescent screen and said viewing screen, the spherical surfaces of said end wall, said viewing screen and said members having substantially the same center of curvature.

8. An optical system for television projection apparatus comprising, a cathode ray tube having an evacuated envelope provided with a transparent spherical end wall, a fluorescent screen formed on the inside of said tube end wall and adapted to have reproduced thereon an optical image by the deflection of an electron beam thereover, a spherical viewing screen facing said fluorescent screen, an aplanatic optical member having a first end wall located adjacent to said cathode ray tube end wall and a second substantially spherical end wall located opposite to said first end wall, and a plurality of spherical light reflecting members located between said aplanatic member and said viewing screen, the spherical surfaces of said tube end wall, said viewing screen and said members having substantially the same center of curvature.

9. An optical system for television projection apparatus comprising, a cathode ray tube having an evacuated envelope provided with a spherical transparent end wall, a fluorescent screen formed on the inside of said tube end wall and adapted to have reproduced thereon an optical image by the deflection of an electron beam thereover, a spherical viewing screen facing said fluorescent screen, an aplanatic optical member having a first end wall located in intimate contact with said cathode ray tube end wall and a second substantially spherical end wall located opposite to said first end wall, a concave spherical light reflecting member facing said tube end wall, and a convex spherical light reflecting member located between said aplanatic member and said concave reflecting member, the spherical surfaces of said end walls, said viewing screen and said members having substantially the same center of curvature.

10. An optical system for television projection apparatus comprising, a cathode ray tube having an evacuated envelope provided with a spherical transparent end wall, a fluorescent screen formed on the inside of said tube end wall and adapted to have reproduced thereon an optical image by the deflection of an electron beam thereover, a spherical viewing screen facing said fluorescent screen, an aplanatic optical member having a first substantially spherical end wall located in intimate contact with said cathode ray tube end wall and a second substantially spherical light refracting end wall of greater curvature located opposite to said first spherical end wall, a concave spherical light reflecting member facing said tube end wall and being provided with a centrally located circular aperture, and a convex spherical light reflecting member located between said aplanatic member and said concave reflecting member, the spherical surfaces of said end walls, said viewing screen and said members having substantially the same center of curvature.

FRANÇOIS CHARLES
PIERRE HENROTEAU.

REFERENCES CITED

The following references are of record in the file of this patent:

UNITED STATES PATENTS

| Number | Name | Date |
|---|---|---|
| 2,141,884 | Sonnefeld | Dec. 27, 1938 |
| 2,229,302 | Martin et al. | Jan. 21, 1941 |
| 2,273,801 | Landis | Feb. 17, 1942 |
| 2,305,855 | Epstein et al. | Dec. 22, 1942 |
| 2,306,679 | Warmisham | Dec. 29, 1942 |
| 2,327,947 | Warmisham | Aug. 24, 1943 |
| 2,350,112 | Houghton | May 30, 1944 |
| 2,380,887 | Warmisham | July 31, 1945 |

FOREIGN PATENTS

| Number | Country | Date |
|---|---|---|
| 541,651 | Great Britain | Dec. 5, 1941 |
| 544,694 | Great Britain | Apr. 23, 1942 |
| 410,263 | France | Mar. 10, 1910 |